United States Patent [19]

Sakakibara

[11] 4,138,846
[45] Feb. 13, 1979

[54] ACCUMULATOR FOR HYDRAULIC CONTROL SYSTEM

[75] Inventor: Shiro Sakakibara, Toyokawa, Japan

[73] Assignee: Aisin Warner Kabushiki Kaisha, Aichi, Japan

[21] Appl. No.: 859,939

[22] Filed: Dec. 12, 1977

[30] Foreign Application Priority Data

Dec. 14, 1976 [JP] Japan ................... 51-150654

[51] Int. Cl.$^2$ .................. F16L 55/04; F16D 31/02
[52] U.S. Cl. ........................ 60/435; 60/413; 138/31
[58] Field of Search .............. 138/30, 31, 26; 91/31, 91/6; 92/62, 63, 51

[56] References Cited

U.S. PATENT DOCUMENTS 3,985,063  10/1976  Lemon ................. 138/31 X

FOREIGN PATENT DOCUMENTS 1234388  6/1971  United Kingdom ............. 60/413

Primary Examiner—Harry N. Haroian
Attorney, Agent, or Firm—Oblon, Fisher, Spivak, McClelland & Maier

[57] ABSTRACT

An accumulator for a hydraulic control system of frictional engagement mechanisms comprises a housing with a stepped bore, a first stepped piston reciprocable within the bore to form a back pressure chamber communicated with a source of line pressure, a second piston reciprocable within the first piston in a predetermind stroke to form an accumulation chamber communicated with the line pressure source, and a spring for biasing the second piston toward the accumulation chamber. In the initial stage, only the second piston is retracted against biasing force of the spring to modulate the line pressure acting on the frictional engagement mechanisms and is engaged at its retracted stroke end with the first piston. Subsequently, the first piston is retracted together with the second piston against the biasing force and the pressure in the back pressure chamber to further modulate the line pressure.

3 Claims, 7 Drawing Figures

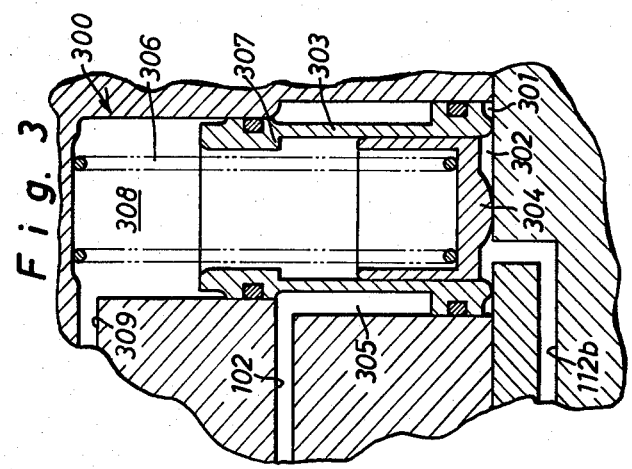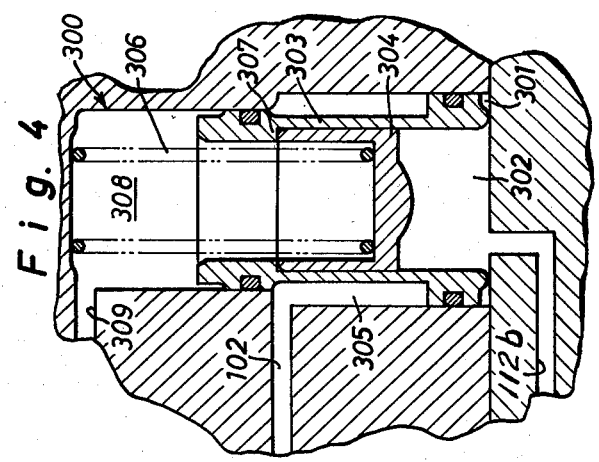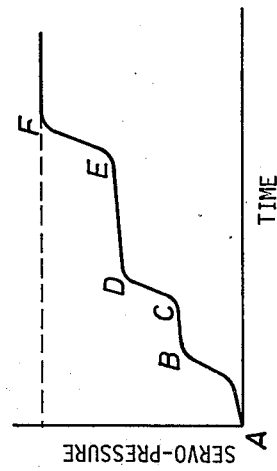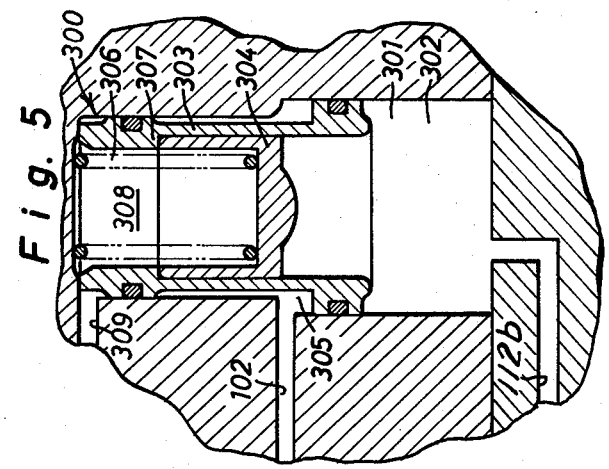

ACCUMULATOR FOR HYDRAULIC CONTROL SYSTEM

BACKGROUND OF THE INVENTION

The present invention relates to an accumulator to modulate line pressure within a control system for a hydraulically operated mechanism, such as a frictional engagement mechanism of an automatic transmission for an automobile.

In a conventional hydraulic transmission for an automobile, it has been observed that when the line pressure is rapidly applied to the frictional engagement mechanism to change the drive power train of the transmission, the mechanism is suddenly connected to engine torque to cause undesired and unpleasant shocks. On the other hand, if the line pressure increases slowly, slips occur within the frictional engagement mechanism to give unpleasant feeling or sensitive and to cause overrunning of the engine. To eliminate such drawbacks, it is required that engagement and disengagement of the mechanism is properly conducted in accordance with changes of the engine torque by shifting of the drive power train in the transmission.

SUMMARY OF THE INVENTION

It is, therefore, a primary object of the present invention to provide an accumulator capable of preventing rapid and full increase of the line pressure to elminate unpleasant shocks.

Another object of the present invention is to provide an accumulator to modulate the line pressure so as to conduct engagement and disengagement of the frictional engagement mechanism in accordance with changes of the engine torque due to shifting of the drive power train in the transmission.

According to the present invention briefly summarized, there is provided an accumulator for a hydraulic control system of a frictional engagement mechanism, which comprises a housing provided therein with a stepped bore, a first stepped piston reciprocable within the bore to form an annular chamber in open communication with a port provided through the housing, the first piston provided therein with an annular stepped shoulder, a second piston reciprocable within the first piston in a predetermined stroke to form a pressure chamber in open communication with another port provided through the housing, the second piston being at its retracted stroke end with the shoulder of the first piston, and a compression spring for biasing the second piston toward the pressure chamber, the ports being respectively connected, in use of the accumulator, to the line pressure circuit for the frictional engagement mechanism.

BRIEF DESCRIPTION OF THE DRAWINGS

Other objects and features of the present invention will be more clear in the following description of preferred embodiments, especially when read together with accompanying drawings, in which:

FIGS. 3, 4 and 5 illustrate the mode of operation of an accumulator in accordance with the present invention;

FIG. 6 indicates a curve of increase of the fluid pressure applied to the servomotor of a friction brake through the accumulator.

DESCRIPTION OF THE PREFERRED EMBODIMENTS

Figure 1:
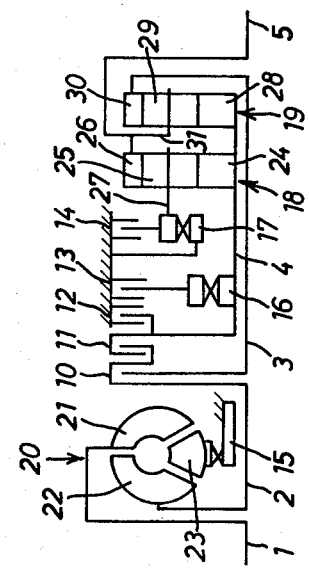
FIG. 1 is a schematic view of an elevational section of an automatic transmission.

Referring now to the drawings, in particular to FIG. 1, a conventional automatic transmission may be seen to comprise a drive shaft 1, an input shaft 2, intermediate shafts 3 and 4, and an output shaft 5. The drive shaft 1 may be the usual crankshaft of a vehicle engine and the output shaft 5 may be connected by any suitable means with the driving road wheels of the vehicle. The input shaft 2 and the intermediate shafts 3 and 4 are in effect piloted with respect to the shafts 1 and 5. The transmission comprises in general a hydraulic torque converter 20, hydraulically operated friction clutches 10 and 11, hydraulically operated friction brakes 12 to 14, one-way clutches 15 to 17, and planetary gear sets 18 and 19.

The hydraulic torque converter 20 includes a pump impeller 21, a turbine runner 22 and a vaned stator 23. The pump impeller 21 is driven by the drive shaft 1 and the turbine runner 22 is connected to the input shaft 2. The stator 23 is rotatably mounted on a stationary sleeve, which is fixed to the transmission housing, and the one-way clutch 15 is disposed between the stator 23 and the stationary sleeve. The one-way clutch 15 is so arranged as to allow free rotation of the stator 23 in the forward direction, that is in the same direction in which the drive shaft 1 rotates and prevents rotation of the stator 23 in the reverse direction.

The first friction clutch 10 is arranged to connect the input shaft 2 with the intermediate shaft 3, and the second friction clutch 11 is arranged to connect the input shaft 2 with the intermediate shaft 4 rotatable on the shaft 3. The first planetary gear set 18 comprises a first sun gear 24 fixed to the intermediate shaft 4, a planet gear 25 in mesh with the sun gear 24, and a ring gear 26 in mesh with the planet gear 25. The planet gear 25 is journalled on a carrier 27 which is rotatably disposed within the transmission housing through the one-way clutch 17. The carrier 27 is provided thereon with the third friction brake 14, and the ring gear 26 is connected to the output shaft 5. The one-way clutch 17 is so arranged as to allow free rotation of the carrier 27 in the forward direction, that is in the same direction in which the drive shaft 1 rotates and prevents rotation of the carrier 27 in the reverse direction.

The second planetary gear set 19 comprises a second sun gear 28 fixed to the intermediate shaft 4, a second planet gear 29 in mesh with the sun gear 28, and a ring gear 30 in mesh with the planet gear 29. The ring gear 30 is connected to the intermediate shaft 3, and the planet gear 29 is journalled on a carrier 31 which is connected to the output shaft 5. The intermediate shaft 4 is provided thereon with the first friction brake 12 and further provided thereon with the second friction brake 13 through the one-way clutch 16.

For understanding respective drive power trains under each shifted position of the transmission, the relative engagement and disengagement of the friction clutches, the friction brakes and the one-way clutches may be summarized in the following chart. In the chart, the symbol of "O" means engagement of the indicated friction brakes and clutches, the symbol of "X" means engagement of the indicated friction brakes during engine braking operation of the vehicle, and the symbol of "#" means engagement of the one-way clutches during travel of the vehicle.

|  | Clutches | | Brakes | | | One-way Clutches | |
|---|---|---|---|---|---|---|---|
|  | (10) | (11) | (12) | (13) | (14) | (16) | (17) |
| First | 0 |  |  |  | X |  | # |
| Second | 0 |  | X | 0 |  | # |  |
| Third | 0 | 0 |  | 0 |  |  |  |
| Reverse |  | 0 |  |  | 0 |  |  |

Figure 2:
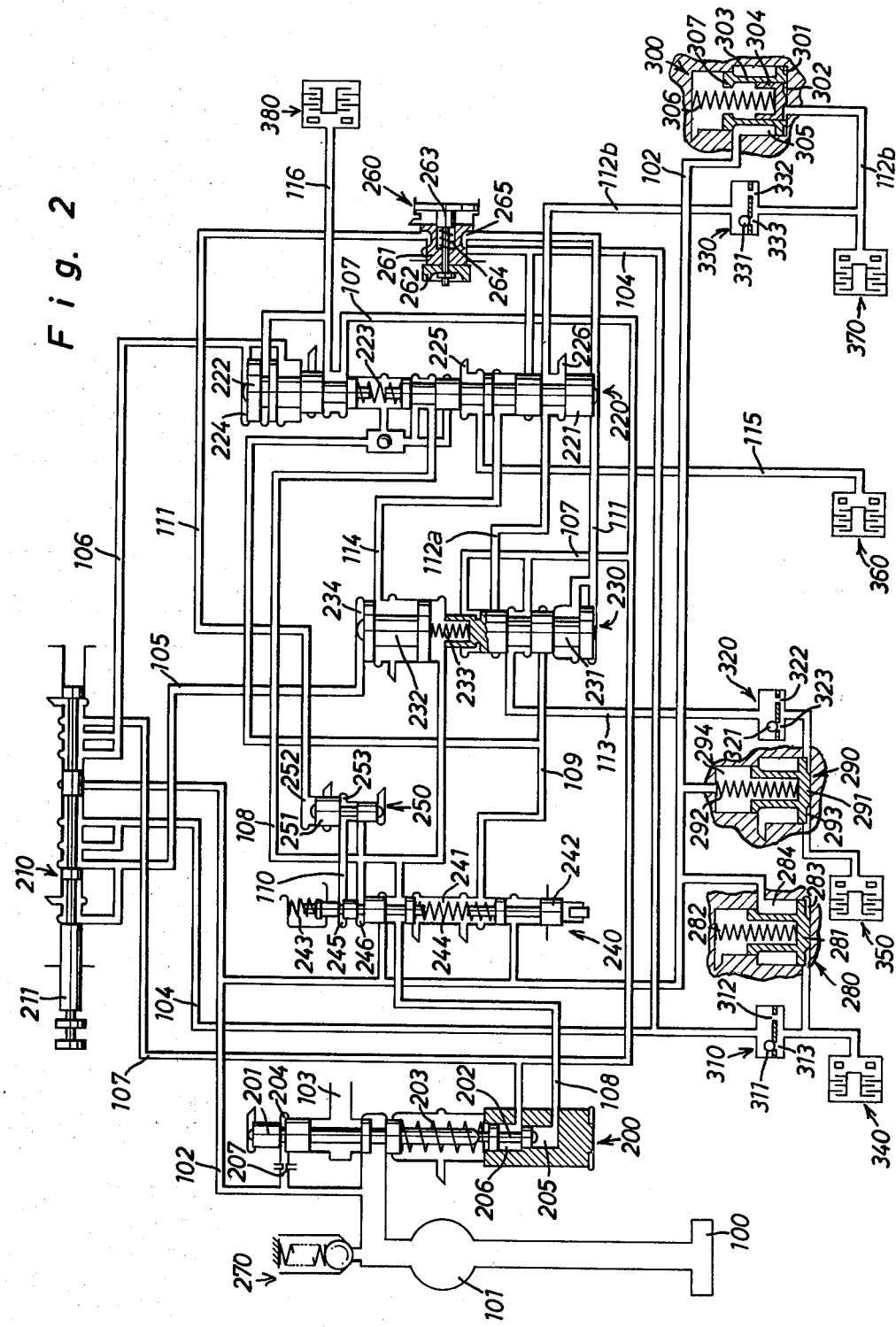
FIG. 2 illustrates a hydraulic control system for the transmission to which the present invention is adapted.

In FIG. 2, there is illustrated a hydraulic control system for the transmission which comprises in general a fluid pump 101 driven by the drive shaft 1 to provide a line pressure as a source of hydraulic pressure, a pressure regulator valve 200 to regulate the line pressure from the pump 101, and a manual selector valve 210 for conditioning the transmission to operate in different power trains by shifting fluid passages 104, 105, 106 and 107 leading respectively to servomotors 340, 350, 360, 370 and 380 of the friction clutches and brakes. The displacement of the selector valve 210 is carried out through a manual shift lever (not shown) provided in the vehicle cab for desired operation of the operator. The servomotors 340 and 350 are provided for engagement and disengagement of the first and second friction clutches 10 and 11, and the servomotors 360, 370 and 380 are provided for engagement and disengagement of the friction brakes 12, 13 and 14. In the hydraulic control system, the line pressure applied to the servomotor 340 may be controlled by an orifice 312 of a check valve 310 and an accumulator 280, and also the line pressure to the servomotor 350 may be controlled by an orifice 322 of a check valve 320 and an accumulator 290. Furthermore, the line pressure applied to the servomotor 370 may be controlled by an orifice 332 of a check valve 330 and an improved accumulator 300. Thus, it should be recognized that provision of the accumulator 300 is the subject matter to complete the present invention.

The hydraulic control system further includes a throttle valve 240 for providing a throttle pressure in response to depression of an accelerator pedal of the vehicle, a governor valve 260 to provide a governor pressure in response to rotation speed of the output shaft 5, a 1-2 shift valve 220 controlled by the throttle and governor pressures to regulate engagement and disengagement of the friction brakes 12, 13 and 14, a 2-3 shift valve controlled by the throttle and governor pressures to regulate engagement and disengagement of the friction clutch 11 and brake 13, and a cut-back valve for providing a cut-back pressure to decrease the throttle pressure.

With reference to the second chart described below, the operation of the hydraulic control system will be described in accordance with shifting the manual shift lever to its several positions which correspondingly determines the positions of the manual selector valve 210 to condition the transmission for the selected drive range.

| Selected Position | Passage (104) | Passage (105) | Passage (106) | Passage (107) |
|---|---|---|---|---|
| Reverse | — | — | 0 | 0 |
| Neutral | — | — | — | — |
| D-range | 0 | — | — | — |
| 2nd-range | 0 | 0 | — | — |
| Low-range | 0 | 0 | 0 | — |

In the second chart, the symbol of "-" means interruption of the indicated passage, and the symbol of "O" means communication of the indicated passage with the line pressure.

NEUTRAL RANGE

When a spool 211 in the selector valve 210 is in the neutral position thereof, all of the fluid passages 104 to 107 are isolated from a line pressure passage 102 to interrupt the line pressure applied to all of the servomotors 340 to 380, which maintains the neutral condition of the transmission. In this instance, the pressurized fluid within the passage 102 is controlled in pressure by the regulator valve 200 in a predetermined value and then supplied through a passage 103 to the torque convertor 20 and other lubricated portions.

DRIVE RANGE

When the manual selector valve 210 is shifted to its Drive Range position, the line pressure passage 102 is communicated with the passage 104 to apply the line pressure to the servomotor 340, the governor valve 260 and the 1-2 shift valve 220. Immediately after the shifting of the selector valve 210, the line pressure to the servomotor 340 is temporarily decreased by the orifice 312 of the check valve 310 and the accumulator 280 to smoothly conduct initial engagement of the friction clutch 10 and subsequently increased up to conduct the full engagement of the clutch 10. Thus, the transmission is conditioned for the first speed ratio power train. Under this condition, a spool 221 of the 1-2 shift valve 220 is in the lower position due to loading of a spring 223 to block the line pressure from the passage 104.

When the governor pressure is increased in accordance with increase of the vehicle speed, the spool 221 of the 1-2 shift valve 220 is moved upward by the increased governor pressure to connect the passage 104 with passages 112a and 112b. Then, the line pressure is applied to the servomotor 370 and the 2-3 shift valve 230. Immediately after the communication between the passages 104 and 112b, the line pressure to the servomotor 370 is temporarily decreased by the orifice 332 of the check valve 330 and the accumulator 300 to smoothly conduct initial engagement of the second friction brake 13 and subsequently increased up to conduct full engagement of the brake 13. Thus, the transmission is conditioned for the second speed ratio power train as shown in the first chart. Under this condition, a spool 231 of the 2-3 shift valve 230 is in the lower position due to loading of a spring 233 to block the line pressure from the passage 112a.

When the governor pressure is further increased in accordance with increase of the vehicle speed, the spool 231 of the 2-3 shift valve 230 is moved upward by the increased governor pressure to connect the passage 112a to a passage 113 so that the line pressure is applied to the servomotor 350. Immediately after the communication between the passages 112a and 113, the line pressure to the servomotor 350 is temporarily decreased by the orifice 322 of the check valve 320 and the accumulator 290 and subsequently increased up to conduct full engagement of the friction clutch 11. Thus, the transmission is conditioned for the third speed ratio power train as shown in the first chart.

SECOND RANGE

When the manual selector valve 210 is shifted to its Second Range position, the line pressure passage 102 is communicated with the passages 104 and 105. The line pressure from the passage 105 is applied to an upper chamber 234 of the 2-3 shift valve 230 in such a manner that a spool 232 of the valve 230 is moved downward against the spring 233 to connect the passage 105 with a passage 114. The line pressure from the passage 104 is applied to the servomotor 340, the governor valve 260 and the 1-2 shift valve so that the friction clutch 10 is engaged by operation of the servomotor 340 as described above.

When the governor pressure is increased in accordance with increase of the vehicle speed, the spool 221 of the 1-2 shift valve 220 is moved upward by the increased governor pressure to connect the passages 104 and 114 to the passages 112b and 115 respectively. Then, the line pressure is applied to the servomotors 370 and 360 from the respective passages 104 and 114 to engage the friction brakes 12 and 13. Due to engagement of the first brake 12, the sun gears 24 and 28 of the planetary gear sets 18 and 19 are locked to effect the engine braking operation of the vehicle. Thus, the transmission is conditioned for the second speed ratio power train as shown in the first chart. Thereafter, if the governor pressure is decreased to move down the spool 221 of the 1-2 shift valve 220, the passage 115 is connected to a drain port 225 to disengage the first brake 12, while the passage 112b is connected to a drain port 226 to disengage the second brake 13.

LOW RANGE DRIVE

When the manual selector valve 210 is shifted to its Low Range position, the line pressure passage 102 is communicated with the passages 104, 105 and 106. The line pressure from the passage 105 is applied to the passage 114 through the 2-3 shift valve, as mentioned above, and the line pressure from the passage 104 is applied to the servomotor 340 so that the friction clutch 10 is engaged by operation of the servomotor 340, as mentioned above. At the same time, the line pressure from the passage 106 is applied to an upper chamber 224 of the 1-2 shift valve 220 in such a manner that a spool 222 of the valve 220 is moved downward against the spring 223 to connect the passage 106 with a passage 116. Then, the servomotor 380 is operated by the line pressure from the passage 116 to engage the friction brake 14. Due to engagement of the brake 14, the carrier 27 of the planetary gear set 18 is locked to effect the engine braking operation of the vehicle. Thus, the transmission is conditioned for the first speed ratio power train.

REVERSE DRIVE

When the manual selector valve 210 is shifted to its Reverse position, the line pressure passage 102 is communicated with the passages 106 and 107 so that the line pressure is applied to the regulator valve 200, the 1-2 shift valve 220 and the 2-3 shift valve 230. Then, the regulator valve 200 acts to increase the value of the line pressure in response to shifting of the selector valve 210, and subsequently the increased line pressure is applied to the servomotors 350 and 380 respectively across the 2-3 shift valve 230 and the 1-2 shift valve 220. Thus, the second clutch 11 and the third brake 14 are engaged by each operation of the servomotors 350 and 380 to provide the reverse drive power train.

To clearly point out the subject matter of the present invention, the construction and operation of the improved accumulator 300 will be described hereinafter in detail. As shown in FIG. 3, the accumulator 300 includes a first cylindrical stepped piston 303 reciprocable within a stepped bore of the transmission housing, a second piston 304 reciprocable within the first piston 303, and a compression spring 306 biasing the second piston 304 downward. An annular chamber 301 formed by the first piston 303 is closed in the initial stage and a pressure chamber 302 formed by the second pisotn 304 is connected to the 1-2 shift valve 220 through the passage 112b and the check valve 330. An annular back pressure chamber 305 formed around the first piston 303 is connected to the line pressure passage 102 to receive the line pressure therein and a drain chamber 308 behind the pistons is connected to the fluid reservoir 100 through a port 309. Further, the first piston is provided thereon with an annular shoulder 307 engageable with the upper end of the second piston 304.

During operation of the transmission mentioned above, when the spool 221 of the 1-2 shift valve 220 is moved upward in accordance with increase of the governor pressure under a forward drive range of the transmission, the line pressure is applied to the servomotor 370 and the accumulator 300 through the passage 112b and the orifice 332 of the check valve 330. Then, the value of the line pressure increases up to certain one in the second chamber 302 of the accumulator 300 to start upward movement of the second piston 304. Until the second piston 304 starts it upward movement, the pressure value in the second chamber 302 increases as understood from a slope shown by solid line A-B in FIG. 6. When the second piston 304 starts its upward movement, the counter resilient force of the spring 306 is effected to gradually increase the pressure value in the second chamber 302 as shown by solid line B-C of which the slope degree is less than that of the solid line A-B. Upon engagement of the second piston 304 against the shoulder 307 of first piston 303, as shown in FIG. 4, the pressure value further increases due to back pressure in the chamber 305 as shown by solid line C-D in FIG. 6. Subsequently, when the first piston 303 starts its upward movement with the second piston 304, the back pressure and the resilient force of the spring 306 are effected to gradually increase the pressure value in the first and second chambers 301 and 302. The solid line D-E in FIG. 6 shows the slow increase of the pressure value. When the first piston 303 is moved to the end of its stroke as shown in FIG. 5, the pressure value in the chambers 301 and 302 effecting actuation of the servomotor 370 increases to become equal to that of the line pressure as shown by solid line E-F in FIG. 6.

The changes of the pressure value shown in FIG. 6 correspond to the engagement of the second friction brake 13 as explained below. The rapid increase of the pressure shown by the solid line A-B is utilized for compensating non-effective stroke of the servomotor 370 at the initial stage of the braking operation. The gradual increase of the pressure shown by the solid line B-C-D is necessary for initial engagement of the brake 13. Then, the engagement of the brake 13 is completed by the subsequent gradual increase of the pressure shown by the solid line D-E so as to eliminate unpleasant shocks. Finally, the highest pressure value must be higher than that necessary for full engagement of the brake 13 to secure the braking operation. In addition, when the transmission is changed from the third speed ratio power train to the second speed ratio power train under the Drive Range, the full engagement of the brake 13 is conducted by the gradual increase of the pressure shown by the solid line B–C, because the instant rotation torque of the second sun gear 28 decreases.

Figure 7:
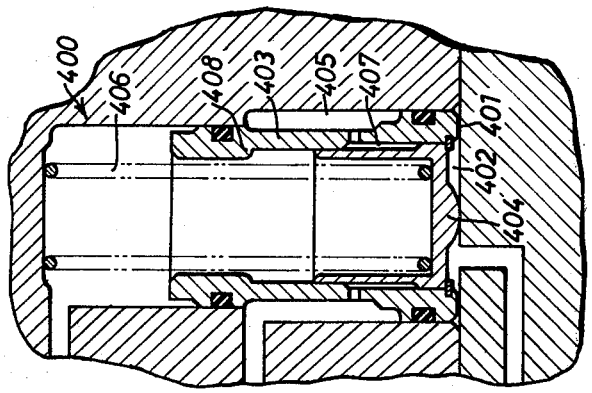
FIG. 7 illustrates a modification of the accumulator in accordance with the present invention.

FIG. 7 illustrates a modification of the accumulator 400 wherein the first piston 303 is replaced with a stepped piston 403 and the second piston 304 is replaced with a stepped piston 404. This modification is characterized in that an annular chamber 407 formed by the pistons 403 and 404 is communicated with an annular back pressure chamber 405 through radial holes of the piston 403 to receive the line pressure therein.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An accumulator for a hydraulic control system of frictional engagement mechanisms, comprising:
   a housing provided therein with a stepped bore;
   a first stepped piston reciprocable within said bore to form an annular back pressure chamber in open communication with a port provided through said housing, said first piston being provided therein with an annular stepped shoulder;
   a second piston reciprocable within said first piston in a predetermined stroke to form a pressure chamber in open communication with another port provided through said housing, said second piston being engaged at its retracted stroke end with the shoulder of said first piston; and
   resilient means for biasing said second piston toward said pressure chamber; said ports being respectively connected, in use of the accumulator, to the line pressure circuit for said frictional engagement mechanisms.

2. An accumulator as claimed in claim 1, wherein said first piston is provided thereon with a radial hole opening to said back pressure chamber and said second piston is a stepped piston cooperating with said first piston to form an annular chamber connected to said back pressure chamber through said radial hole.

3. A hydraulic control system for a transmission of a vehicle having an input shaft adapted to be driven by an engine, an output shaft adapted to drive the vehicle, means for providing multi-ratio power trains between said input and output shafts, and frictional engagement mechanisms including fluid pressure actuated servo-means for engagement thereof for completing said power trains when engaged, said hydraulic control system comprising:
   a source of line pressure;
   a line pressure passage for applying line pressure from said pressure source to said servo-means;
   manual selector valve means disposed within said line pressure passage for selectively connecting said line pressure passage to said servo-means; and
   an accumulator interposed between said selector valve means and said servo-means for modulating the line pressure applied to said servo-means; said accumulator including a housing provided with a stepped bore, a first stepped piston reciprocable within said bore for forming an annular back pressure chamber in open communication with said line pressure passage, said first piston being provided therein with an annular stepped shoulder, a second piston reciprocable within said first piston in a predetermined stroke for forming a pressure chamber in open communication with said servo-means, said second piston being engaged at its retracted stroke end with the shoulder of said first piston, and resilient means for biasing said second piston toward said pressure chamber.

* * * * *